July 14, 1936.  C. OPOLO  2,047,287
RESILIENT AXLE STEERING GEAR
Filed Jan. 3, 1935  2 Sheets-Sheet 2
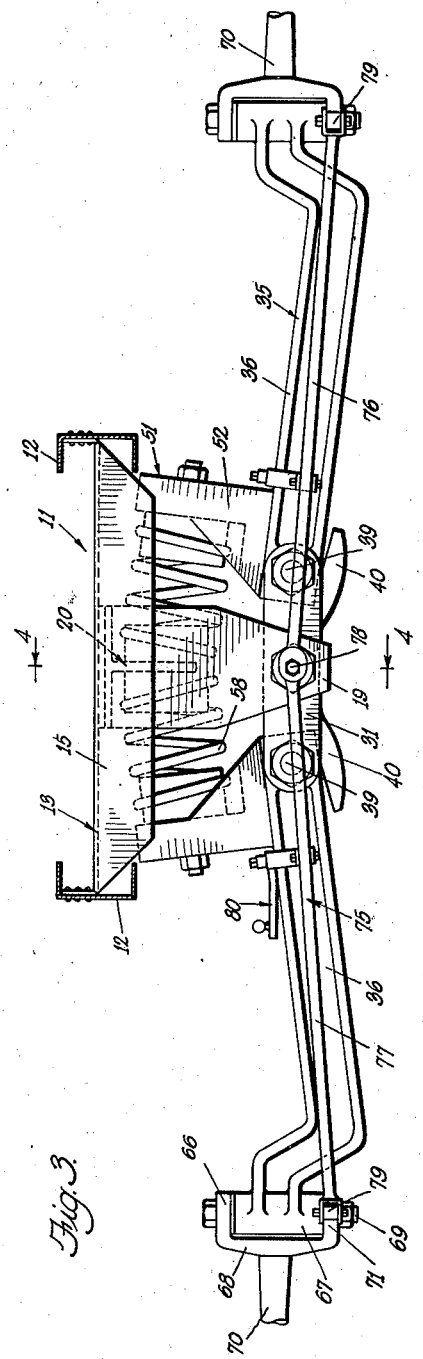
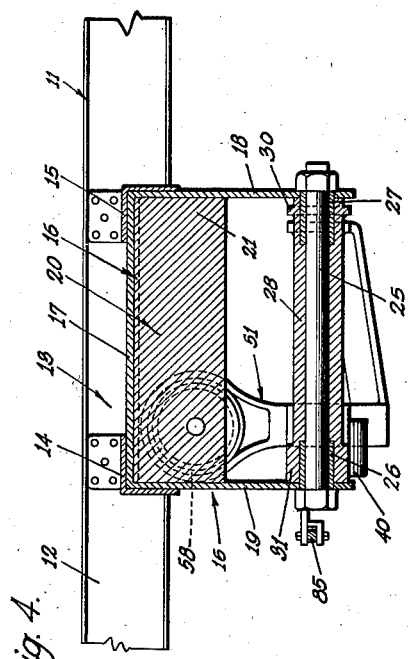
Inventor
C. Opolo
by Hazard and Miller
Attorneys.

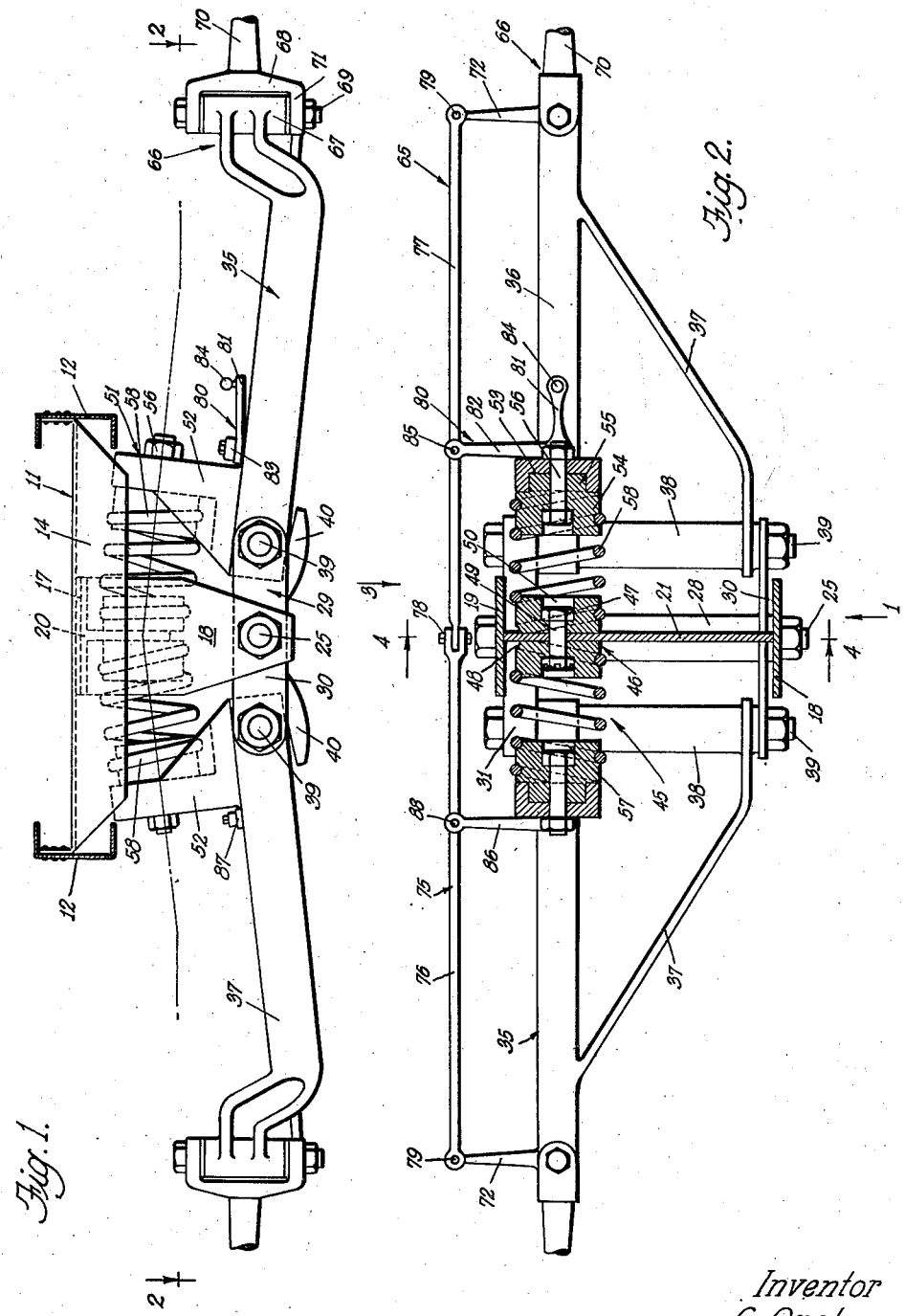

Patented July 14, 1936

2,047,287

UNITED STATES PATENT OFFICE 2,047,287

RESILIENT AXLE STEERING GEAR

Charles Opolo, Culver City, Calif.

Application January 3, 1935, Serial No. 287

13 Claims. (Cl. 280—124)

My invention relates to an improvement in resilient axles and steering gears therefor, this being of a type in which the axle sections carrying the wheels are hinged or pivoted to the frame of the vehicle by longitudinally extending pintles, or the like. These axle sections have a spring mounting so that each half axle section may have an independent up and down movement without materially affecting the other half axle section.

My present invention may be considered as an improvement on, and further development of the invention of my applications, Serial No. 722,268, filed April 25, 1934, entitled Flexible axle for vehicles, and Serial No. 714,971, filed March 10, 1934, entitled Flexible axle for vehicles, and of my Patent No. 1,978,114, issued October 23, 1934, maturing from application Serial No. 716,831, filed March 22, 1934, Double action axle.

In my present invention the vehicle frame has a bracket at its forward end extending downwardly, and to this bracket there is pivoted a double axle lever. The connection between the bracket and the lever employs a single central pintle. Each axle section is pivoted to the outer end of the axle lever by a longitudinally extending pintle and each half axle thus developed has the steering knuckle and steering wheels mounted thereon.

With this type of construction, one of the objects and features of my invention is employing a spring assembly between each half axle section and the vehicle frame in which I employ a coiled helical spring between special spring mountings on each half axle section, and a depending structure from the vehicle frame. A further feature of my invention in regard to the springs and spring seats is the employment of a type of seat which causes each spring to act both as a tension and as a compression spring by firmly securing one end of each spring to the structure depending from the vehicle frame and the other end of each spring to the spring seat on the half axle section.

A further object and feature of my invention in regard to the spring mounting is constructing the spring seats of suitable blocks preferably cylindrical and having helical grooves formed therein. The end portions of the spring are threaded onto these grooves and thus these springs are firmly and securely attached to the spring seat blocks due to their resiliency. Hence, when the spring seat blocks are attached respectively to the vertical frame and to the half axle sections, the coil springs function to develop both a compressive and extension action.

Another object and feature of my invention in the above type of axle is a steering mechanism having jointed links, the links connecting to bell cranks on the yokes of the steering knuckles. A further detailed feature is employing a transverse link formed with a jointed section extending between the bell cranks on the the knuckle yokes, this link preferably being located back of the axle and in substantially the plane of the main action of the axle.

A further detailed feature consists of locating the joints in the cross link so that when the vehicle is travelling in a straight direction the joint is substantially in vertical and horizontal alignment with the pintle of the axle lever. Thus, the steering link accommodates itself or pivots for straight-ahead driving on substantially the same longitudinal axis as the axle sections pivot when each half axle operates independently of the other, or both react simultaneously to bumps or depressions in the road. With my invention the transverse steering link may be reciprocated with a cross motion by any suitable steering mechanism.

My invention is illustrated in connection with the accompanying drawings, in which:

Fig. 1 is a front elevation taken in the direction of the arrow 1 of Fig. 2, the frame being shown in section.

Fig. 2 is substantially a horizontal section taken on the line 2—2 of Fig. 1 in the direction of the arrows.

Fig. 3 is a rear elevation taken in the direction of the arrow 3 of Fig. 2, the frame being shown in section.

Fig. 4 is a longitudinal vertical section on the line 4—4 of Figs. 2 and 3, taken in the direction of the arrows.

In the drawings a portion of a vehicle frame 11 is indicated, this having longitudinal side beam 12 in the form of channels with the flanges turned inwardly. A transverse brace member 13 is formed of two angles 14 and 15 connected at their opposite ends to the channel beams. A bracket 16 depends from this transverse member, such bracket having a top plate 17, a front end plate 18 and a rear end plate 19. A T-shaped longitudinal bar 20 is centrally located in the bracket and has a depending web 21.

A single central pintle 25 extends through the front and rear plates 18 and 19. This is illustrated as being in the form of a bolt and has a pair of end bushings 26—27 thereon, and a hub 28 of a transverse double lever 29 which double lever has a front and a rear lever arm 30 and 31. Thus, the hub with the front and rear lever arms act as a unit in pivoting on the central pintle 25.

There are two half axle sections 35 each of which has an axle arm 36 and a forwardly extending brace arm 37. These are connected to a hub 38 formed integral and the hub is pivoted on secondary longitudinal pintles 39 which are mounted in the opposite ends of the double lever arms 30 and 31. These secondary pintles are in the form of bolts. Stop fingers 40 are formed integral with the rear arm 31 of the double lever 29 and extend below the main axle sections 36 and limit the downward movement of these axle sections on their pintles 39.

A spring assembly designated by the numeral 45 has a central spring seat 46 which is formed of two spring seat blocks 47 cylindrical on their outside surfaces and each having a helical groove 48. A bolt 49 extends through each of these blocks and the web 21 of the T-shaped bar 20, the bolt heads being counter-sunk in recesses 50, there being one recess in each block. Complementary spring seats 51 employ a bracket 52 secured to or formed integral with each axle section 36. Each of these brackets has a recess 53. Spring seat blocks 54 are illustrated as cylindrical on their outside surfaces and each has a helical groove on its outside surface. An extension 55 fits in the recess 53 and each block 54 is secured to the bracket 52 by a bolt 56, the bolt head being countersunk in a recess 57. There are two coiled springs 58 employed, each of which has one end threaded in the groove on the seat block attached to the web 21, and hence to the frame of the vehicle. The other end of each spring is threaded on the block 54 in the helical groove and is thus attached to the spring seat on each half axle section.

Therefore, these springs each act as compression and tension springs. When either or both half axle sections move upwardly relative to the vehicle frame they cause a compression of the spring between each half axle section and the vehicle frame, whereas, if these axle sections move downwardly, they exert a tension on the spring or at least, relieve the compression. By this construction therefore, the ends of each spring are securely attached to a fixed and a movable spring seat. Manifestly, the double lever 29 may also swing in a vertical plane on its main pintle 25 and thus give an additional flexibility to the operation of each half axle section in the up and down movement of one of these independent of the other. It will therefore be seen that by my construction either half axle section may move up and down in response to bumps or depressions in the road independent of the other half axle section.

The steering mechanism designated by the assembly numeral 65 employs conventional steering knuckles 66, each of which has a hub 67 secured to the axle section 36. A yoke 68 is pivoted to the hub by a spindle 69. Each yoke has a wheel axle 70 and secured to the lower arm 71 of the yoke there is a bell crank steering arm 72.

A transverse link assembly 75 is formed of two link sections 76 and 77 pivoted at their center by a longitudinal pivot 78 and pivoted to each steering bell crank 72 at 79. When the vehicle is travelling in a normal forward direction, the pintle or hinge 78 for the link sections 76 and 77 is substantially in axial alignment with the main pintle 25 of the axle sections.

The vehicle is steered by employing a steering bell crank 80 which is illustrated as having a short arm 81 and a long arm 82 pivoted at their junction angle by a pivot pin 83 secured to one of the main axle sections 36. The arm 81 is illustrated as having a ball 84 to form a connection with a link or other device which may be actuated manually in steering the vehicle. The arm 82 has a somewhat loose pivotal connection 85 to the link section 77. A steadying arm 86 is pivoted at one end 87 to the axle section 36 opposite to that having the bell crank 80. The outer end of the arm 86 has a somewhat loose pivotal connection 88 to the link sections 76 of the main transverse link 75.

The manner of operating and functioning of the steering mechanism and steering links is substantially as follows:

In conjunction with the flexible axle construction; When the vehicle is travelling in a straight forward direction and either or both half axle sections 36 swing up or down on their pintles 39 or these axle sections having a movement with the double lever 29 swing on both the pintles 25 and 39, therefore the half link sections 76—77 may have an up or downward movement either simultaneously or one independent of the other turning on their central joint 78. Therefore, the link mechanism conforms to the up and down movement of the axle sections and in straight ahead driving, the hinge 78, as above mentioned, is in substantial alignment with the main pintle 25. However, in steering the wheels of the vehicle to make it turn, the hinge 78 is moved slightly out of alignment with the pintle 25, but even when moved to its extreme in either direction, each link section 76 and 77 may swing upwardly or downwardly to respond to the movement of the half axle section with which it is associated. The vehicle may thus be steered in either direction and the half axle sections and the steering link 75 accommodate itself to the independent or joint movement of the half axle sections in responding to bumps or depressions in the road.

In the drawings I have illustrated the steadying arm 86. Where the transverse link 75 only has one joint or hinge such as 78 such steadying arm is hardly necessary, but, however, it will be apparent that if it is desired to give greater flexibility to the transverse link 75 I may have additional joints in which case it is desirable to use a steadying arm such as 86, it being borne in mind that the pivotal connection 88 to the transverse link has a more or less loose connection to allow full flexibility to the steering link as the axle sections work up and down in the travel of the vehicle over a rough road.

Various changes may be made in the details of construction without departing from the spirit or scope of the invention as defined by the appended claims.

I claim:

1. In a vehicle, the combination of a vehicle frame having a central bracket, a pair of axle sections, means forming a pivotal connection between the axle sections and the bracket, such pivotal connection extending longitudinally, a spring seat on the bracket, a pair of spring seats one on each axle section, springs secured between the seats, the said seats engaging the spring to cause the spring to act on contraction and on extension, each spring being substantially parallel to an axle section, the said pivotal connection having a central pintle secured to the bracket, each axle section having a steering knuckle with an arm connected thereto, a link connecting the said arms, said link having a hinged joint, the joint, when the vehicle is travelling in a straight direction being substantially aligned with the central pintle, means to actuate the said link, the means to operate the link comprising a bell crank pivoted to one of the axle sections, said bell crank having an arm connected to one portion of the link and a second arm pivoted to another section of the axle and also to another section of the link.

2. In a vehicle, the combination of a vehicle frame having a centrally depending bracket, two half axle sections, means forming a pivotal connection between said axle sections and the bracket, said connection having a central pintle, a spring seat secured to the upper portion of each half axle, a complementary spring seat secured to the bracket, coiled springs connected to said seats, said springs having each of their axes substantially parallel to the axle section to which it is connected, and the connection of the springs to the seats causing the springs to act in compression and extension.

3. In a vehicle as claimed in claim 2, the spring seats having helical grooves, the springs having a helical coil, the ends of the coils being threaded in the said grooves and thereby providing the means for attaching the springs to the seats.

4. In a vehicle as claimed in claim 2, each half axle section having a steering knuckle pivoted thereto, each knuckle having a movable yoke with an arm connected thereto, a link in a plurality of sections pivotally connected to each arm, the sections and the links being hinged together, the said hinge, when the vehicle is travelling in a straight direction, being in substantial alignment with the pintle, and means to reciprocate the link transversely of the vehicle.

5. In a vehicle, a vehicle frame having a depending bracket, a double lever pivoted to the bracket on a longitudinal pintle, two half axle sections each pivoted at its inner end to an outer end of the double lever, a brace having a spring seat connected to each axle section, a pair of complementary spring seats secured to the bracket, a pair of coiled springs each having one end secured to one of the seats on the bracket and the seat on an axle, each spring having its axis substantially parallel to the half axle section.

6. In a vehicle as claimed in claim 5, each axle section having a mounting for a steering wheel, a transverse link connected at its opposite ends to each mounting, the said link having a hinge, the said hinge, when the vehicle is travelling in a straight direction being substantially in alignment with the pintle of the double levers.

7. In a vehicle as claimed in claim 5, each spring seat being formed of a cylindrical block having a helical groove on its periphery, each end of a coil spring being threaded in one of the grooves of a block and thereby securing the springs to the blocks whereby the springs each act to effect both compression and extension.

8. In a vehicle, a vehicle frame having a transverse member with a depending main bracket, the main bracket having a depending web with a pair of cylindrical blocks secured thereto on opposite sides, two axle sections, means pivotally connecting said sections to the main bracket, a secondary bracket secured to each axle section, a cylindrical spring seat block secured to each secondary bracket, each of the blocks having a helical groove, a pair of helically coiled springs, each spring having its opposite ends engaging respectively one of the blocks on the main bracket, and a block on a secondary bracket whereby each spring may react to both compression and extension, each of the springs having its axis substantially parallel to the axle section to which it is connected.

9. In a vehicle as claimed in claim 8, the means pivoting each axle section to the main bracket comprising a double lever pivoted to the main bracket by a main longitudinal pintle and each axle section being pivoted at its inner end to an outer end of the double lever.

10. In a vehicle, the combination of a vehicle frame, a double lever pivoted to the said frame by a longitudinal pintle at about the center of the frame, two axle sections each pivoted at its inner end to an outer end of the double lever, each axle section having a steering means for a wheel with an arm connected thereto, a transverse steering link formed in a first and second section, the outer ends of each section being secured to one of the said arms, the sections of the link having a hinge with a longitudinal pintle, the pintle of the double lever and the pintle of the hinge being in substantial alignment when the vehicle is travelling in a straight direction, and means to actuate said link for steering, the means to actuate the link comprising a bell crank pivotally connected to one of the axle sections, one of the arms of the bell crank having a pivotal connection with the first section of the link, and a second arm pivoted to the other axle section and having a pivotal connection to the second section of the link.

11. In a vehicle, the combination of a vehicle frame having a transverse member with a bracket having a front and a rear depending plate and a central depending web between the plates, a double lever having a front and a rear arm pivoted to the plates of the bracket by a central longitudinal pintle, the arms of the double lever being located each adjacent one of the said plates, two half axle sections each having a main axle arm and a forwardly extending brace arm, the main arm and brace arm being pivotally connected at their inner ends to the outer ends of the arms forming the double lever by a secondary longitudinal pintle, a spring seat secured on each side of the depending web of the bracket, a secondary bracket secured to each of the main axle arm sections, and each having a spring seat and a spring between each of the latter seats and one of the spring seats secured to the web.

12. In a vehicle as claimed in claim 11, the spring seats secured to the web each being cylindrical on its outside surface and secured to the web by a transverse bolt, each of the spring seats secured to the secondary brackets being cylindrical at its outside surface and secured to the secondary bracket by a bolt, all of the spring seats having a helical groove on the cylindrical surface and each spring being helical with its ends threaded in the groove on the spring seat secured to the web and to the secondary bracket.

13. In a vehicle as claimed in claim 11, the outer ends of each main axle section having a steering knuckle for a wheel including a yoke with a steering arm connected to each yoke, a transverse steering link formed in a first and a second section, the outer ends of each section being pivoted to one of the said arms, the sections of the link being hinged together by a longitudinal hinge pintle, the hinge pintle and the main pintle of the double lever being in substantial alignment when the vehicle is travelling in a straight direction, a bell crank pivotally connected to one of the axle sections and having an arm pivotally connected to the first section of the link, a steadying arm pivotally connected to the other main section of the axle and having a pivotal connection to the second section of the link.

CHARLES OPOLO.